US007302854B2

(12) United States Patent
Egermeier et al.

(10) Patent No.: US 7,302,854 B2

(45) Date of Patent: Dec. 4, 2007

(54) METHOD AND APPARATUS FOR THE DETECTION OF HIGH PRESSURE CONDITIONS IN A VACUUM-TYPE ELECTRICAL DEVICE

(75) Inventors: John Egermeier, deceased, late of San Jose, CA (US); by Solinda Egermeier, legal representative, San Jose, CA (US); Roderick C. Mosely, Pleasanton, CA (US); Steven Jay Randazzo, San Jose, CA (US); Bryce Sollazzi, San Jose, CA (US)

(73) Assignee: Jennings Technology, San Jose, CA (US)

( * ) Notice: Subject to any disclaimer, the term of this patent is extended or adjusted under 35 U.S.C. 154(b) by 52 days.

(21) Appl. No.: 11/305,081

(22) Filed: Dec. 16, 2005
(Under 37 CFR 1.47)

(65) Prior Publication Data

US 2006/0196274 A1 Sep. 7, 2006

Related U.S. Application Data

(63) Continuation-in-part of application No. 10/848,874, filed on May 18, 2004, now Pat. No. 7,225,676.

(51) Int. Cl.
*G01L 7/06* (2006.01)

(52) U.S. Cl. .................................... 73/729.1; 73/729.2

(58) Field of Classification Search ............... 73/729.1, 73/729.2

See application file for complete search history.

(56) References Cited

U.S. PATENT DOCUMENTS 3,983,345 A 9/1976 Phillips
4,103,291 A 7/1978 Howe et al.
4,163,130 A 7/1979 Kubota et al.
4,270,091 A 5/1981 Mann
4,295,566 A 10/1981 Vincek
4,402,224 A * 9/1983 Fukushima .................. 73/705
4,403,124 A 9/1983 Perkins et al.
4,440,995 A 4/1984 Lange et al.
4,484,818 A 11/1984 Houston
4,491,704 A 1/1985 Milianowicz et al.
4,513,208 A 4/1985 Kamata
4,547,769 A * 10/1985 Tanigaki et al. ............ 340/626
4,877,143 A 10/1989 Travisano
4,937,698 A 6/1990 Toya et al.
5,286,933 A 2/1994 Pham
5,289,929 A 3/1994 Heilman et al.
5,551,285 A 9/1996 Gannon et al.
6,659,037 B2 12/2003 Hagopian
7,225,676 B2 * 6/2007 Randazzo ..................... 73/700

FOREIGN PATENT DOCUMENTS

EP 0365005 10/1989

* cited by examiner

*Primary Examiner*—Andre J. Allen
(74) *Attorney, Agent, or Firm*—D'Arcy H. Lorimer; Lorimer Labs

(57) ABSTRACT

A method for detecting a high pressure condition within a high voltage vacuum device includes detecting the position of a movable structure such as a bellows or flexible diaphragm. The position at high pressures can be detected optically by the interruption or reflection of light beams, or electrically by sensing contact closure or deflection via strain gauges. Electrical sensing is provided by microcircuits that are operated at high voltage device potentials, transmitting pressure information via RF or optical signals.

22 Claims, 16 Drawing Sheets

312
310
308
300
106
302
304
114
306
104
102

426
424
420

900
302
106
906
114'
902
904
912
910
908
114
104
102

METHOD AND APPARATUS FOR THE DETECTION OF HIGH PRESSURE CONDITIONS IN A VACUUM-TYPE ELECTRICAL DEVICE

CROSS REFERENCE TO RELATED APPLICATIONS

This application is a continuation in part of co-pending non-provisional application Ser. No. 10/848,874 filed May 18, 2004 now U.S. Pat. No. 7,225,676 entitled METHOD AND APPARATUS FOR THE DETECTION OF HIGH PRESSURE CONDITIONS IN A VACUUM SWITCHING DEVICE, and claims benefit thereof. The aforementioned application is herein incorporated by reference in its entirety.

BACKGROUND OF THE INVENTION

1. Field of the Invention

This invention relates to detection of failure conditions in high power electrical switching devices, particularly to the detection of high pressure conditions in high voltage vacuum interrupters, switches, and capacitors.

2. Description of the Related Art

The reliability of the North American power grid has come under critical scrutiny in the past few years, particularly as demand for electrical power by consumers and industry has increased. Failure of a single component in the grid can cause catastrophic power outages that cascade throughout the system. One of the essential components utilized in the power grid are the mechanical switches used to turn on and off the flow of high current, high voltage AC power. Although semiconductor devices are making some progress in this application, the combination of very high voltages and currents still make the mechanical switch the preferred device for this application.

There are basically three common configurations for these high power mechanical switches; oil filled, gas filled, and vacuum. These switches are also known as interrupters. The oil filled switch utilizes contacts immersed in a hydrocarbon based fluid having a high dielectric strength. This high dielectric strength is required to withstand the arcing potential at the switching contacts as they open to interrupt the circuit. Due to the high voltage service conditions, periodic replacement of the oil is required to avoid explosive gas formation that occurs during breakdown of the oil. The periodic service requires that the circuits be shut down, which can be inconvenient and expensive. The hydrocarbon oils can be toxic and can create serious environmental hazards if they are spilled into the environment. Gas filled versions utilize $SF_6$ at pressures above 1 atmosphere absolute. Leaks of $SF_6$ into the environment are not desirable, which makes use of the gas filled interrupters less attractive as well. If an $SF_6$ filled interrupter fails due to leakage, the resulting arc can generate an over pressure condition, or explosive byproducts which can cause breach of containment and severe local contamination. Another configuration utilizes a vacuum environment around the switching contacts. Arcing and damage to the switching contacts can be avoided if the pressure surrounding the switching contacts is low enough. Loss of vacuum in this type of interrupter will create serious arcing between the contacts as they switch the load, destroying the switch. In some applications, the vacuum interrupters are stationed on standby for long periods of time. A loss of vacuum may not be detected until they are placed into service, which results in immediate failure of the switch at a time when its most needed. It therefore would be of interest to know in advance if the vacuum within the interrupter is degrading, before a switch failure due to contact arcing occurs. Currently, these devices are packaged in a manner that makes inspection difficult and expensive. Inspection may require that power be removed from the circuit connected to the device, which may not be possible. It would be desirable to remotely measure the status of the pressure within the switch, so that no direct inspection is required. It would also be desirable to periodically monitor the pressure within the switch while the switch is in service and at operating potential.

Perhaps at first blush it may appear that measurement of pressure within the vacuum envelope of these interrupter devices would be adequately covered by devices of the prior art, but the reality of the circumstances under which these devices operate has made a practical solution of this problem difficult to achieve prior to this invention. A main factor in this regard is that the device is used for controlling high AC voltages, with potentials between 7 and 100 kilovolts above ground, and extremely high currents. This makes application of prior art pressure measuring devices very difficult and expensive. Due to cost and safety constraints, complex high voltage isolation techniques of the prior art are not suitable. What is needed is a practical method and apparatus to safely and inexpensively measure a high pressure condition in a high voltage vacuum device, such as an interrupter, preferably remote from the device, and preferably while the device is at operating potential. It would be of further interest to be able to monitor the pressure status of these vacuum devices while they are powered down, on standby, or in storage prior to use.

FIG. 1 is a cross sectional view 100 of a first example of a vacuum interrupter of the prior art. This particular unit is manufactured by Jennings Technology of San Jose, Calif. Contacts 102 and 104 are responsible for the switching function. A vacuum, usually below $10^{-4}$ torr, is present near the contacts in region 114 and within the envelope enclosed by cap 108, cap 110, bellows 112, and insulator sleeve 106. Bellows 112 allows movement of contact 104 relative to stationary contact 102, to make or break the electrical connection.

FIG. 2 is a cross sectional view 200 of a second example of a vacuum interrupter of the prior art. This unit is also manufactured by Jennings Technology of San Jose, Calif. In this embodiment of the prior art, contacts 202 and 204 perform the switching function. A vacuum, usually below $10^{-4}$ torr, is present near the contacts in region 214 and within the envelope enclosed by cap 208, cap 210, bellows 212, and insulator sleeve 206. Bellows 112 allows movement of contact 202 relative to stationary contact 204, to make or break the electrical connection.

SUMMARY OF THE INVENTION

It is an object of the present invention to provide a method detecting loss of vacuum in a vacuum pressure-type electrical device including a bottle for defining a vacuum pressure condition at the interior of the bottle, and electrical charge members in the bottle mounted for relative movement between a first position in which the electrical charge members are positioned closely adjacent and a second position in which the electrical charge members are spaced apart, with the vacuum in the bottle preventing electrical arcing between the electrical charge members when they are moved between their first and second positions at voltage potentials in excess of 1000 volts, the method including: operatively associating a movable structure having first and second sides with the bottle; exposing the first side of the movable structure to the vacuum pressure condition in the bottle; exposing the second side of the movable structure to a second pressure condition exterior of the bottle, with the movable structure moving in response to the loss of the vacuum pressure condition in the bottle; and monitoring movement of the movable structure to detect the loss of the vacuum pressure condition in the bottle when the electrical charge members are in either their first or second positions.

It is another object of the present invention to provide a vacuum bottle-type electrical device with a vacuum pressure loss detection feature including a bottle defining a vacuum pressure condition at the interior of the bottle; electrical charge members in the bottle mounted for relative movement between a first position in which the electrical charge members are positioned closely adjacent and an second position in which the electrical charge members are spaced apart from each other, with the vacuum pressure condition in the bottle preventing electrical arcing between the electrical charge members when they are moved between their first and second positions at voltage potentials in excess of 1000V; a movable structure associated with the bottle having first and second sides, with the movable structure being exposed to the vacuum pressure condition in the bottle at the first side of the movable structure and to a second pressure condition exterior to the bottle at the second side of the movable structure, with the movable structure moving in response to the loss of the vacuum pressure condition in the bottle; and a monitor for sensing movement of the movable structure to detect loss of the vacuum pressure condition in the bottle when the electrical charge members are in either their first or second positions.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
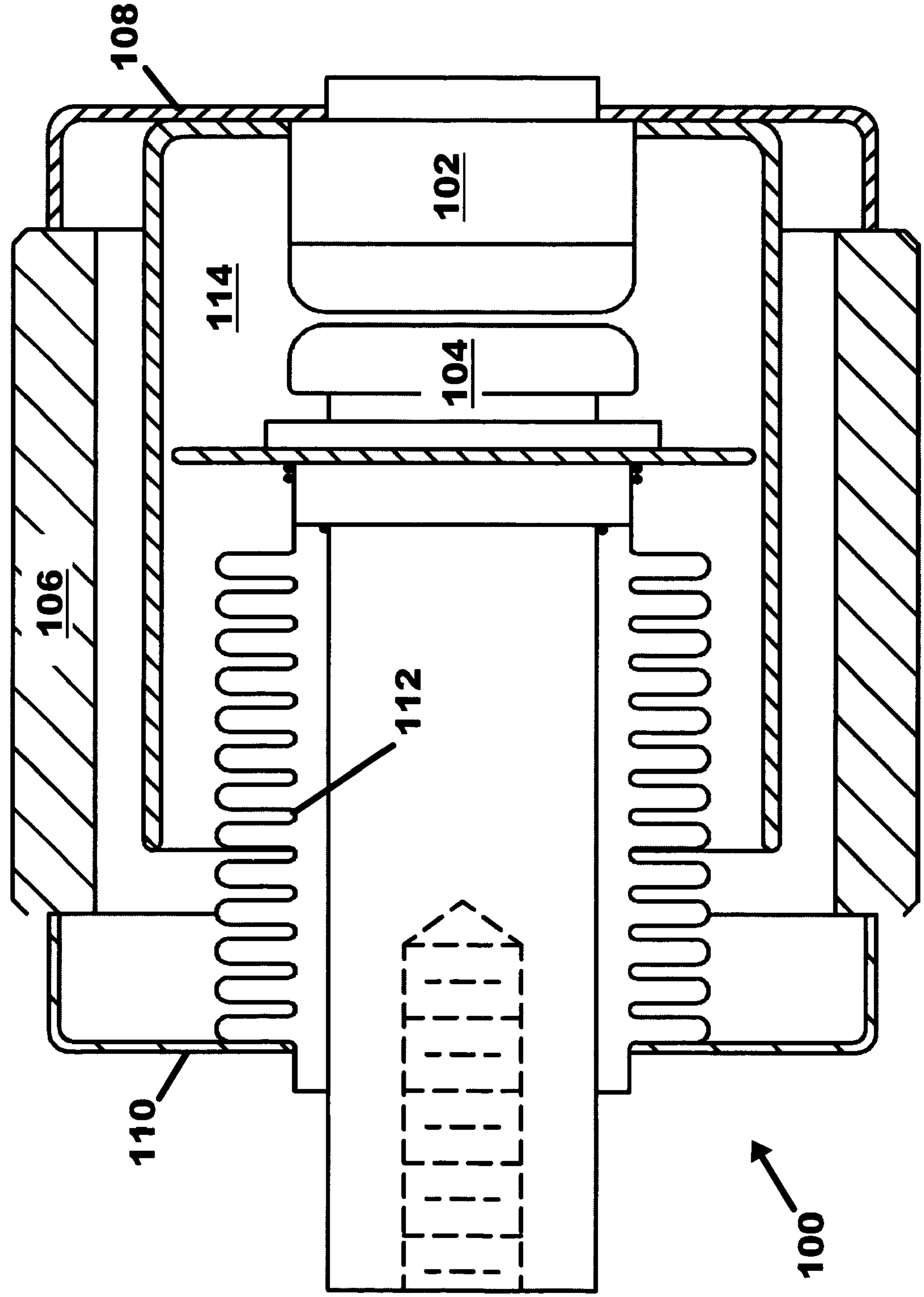
Fig. 1 Prior Art
FIG. 1 is a cross sectional view of a first example of a vacuum interrupter of the prior art.
Figure 2:
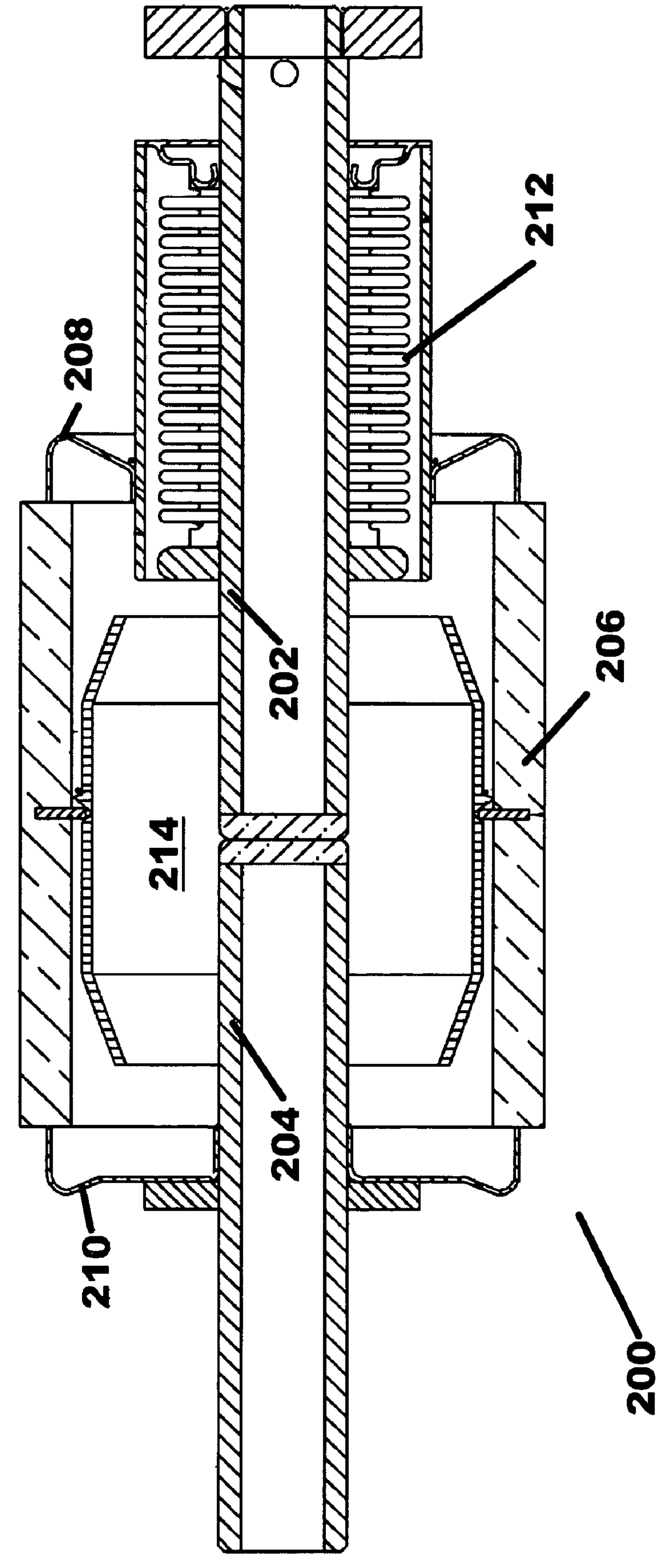
Fig. 2 Prior Art
FIG. 2 is a cross sectional view of a second example of a vacuum interrupter of the prior art.

The present invention is directed toward providing methods and apparatus for the measurement of pressure within a high voltage, vacuum interrupter. In this disclosure, the terms "vacuum interrupter" and "high voltage vacuum switch" are synonymous. In common usage, the term "vacuum interrupter" may imply a particular type of switch or application. Those limitations do not bear upon embodiments of the present invention, as the disclosed embodiments of the present invention may be applied to any high voltage device utilizing internal gas pressures below 1 atm (absolute) as an aid to insulating opposing high voltage potentials. "High voltages" are AC (alternating current) voltages preferably greater than 1000 volts, and more preferably greater than 5000 volts. As an example, various embodiments described subsequently are employed with or within the interrupter shown in FIG. 1. This by no means implies that the inventive embodiments are limited in application to this interrupter configuration only, as the illustrated embodiments of the present invention are equally applicable to the device shown in FIG. 2 or any similar device such as high voltage, vacuum insulated capacitors, for example.

Figure 3:
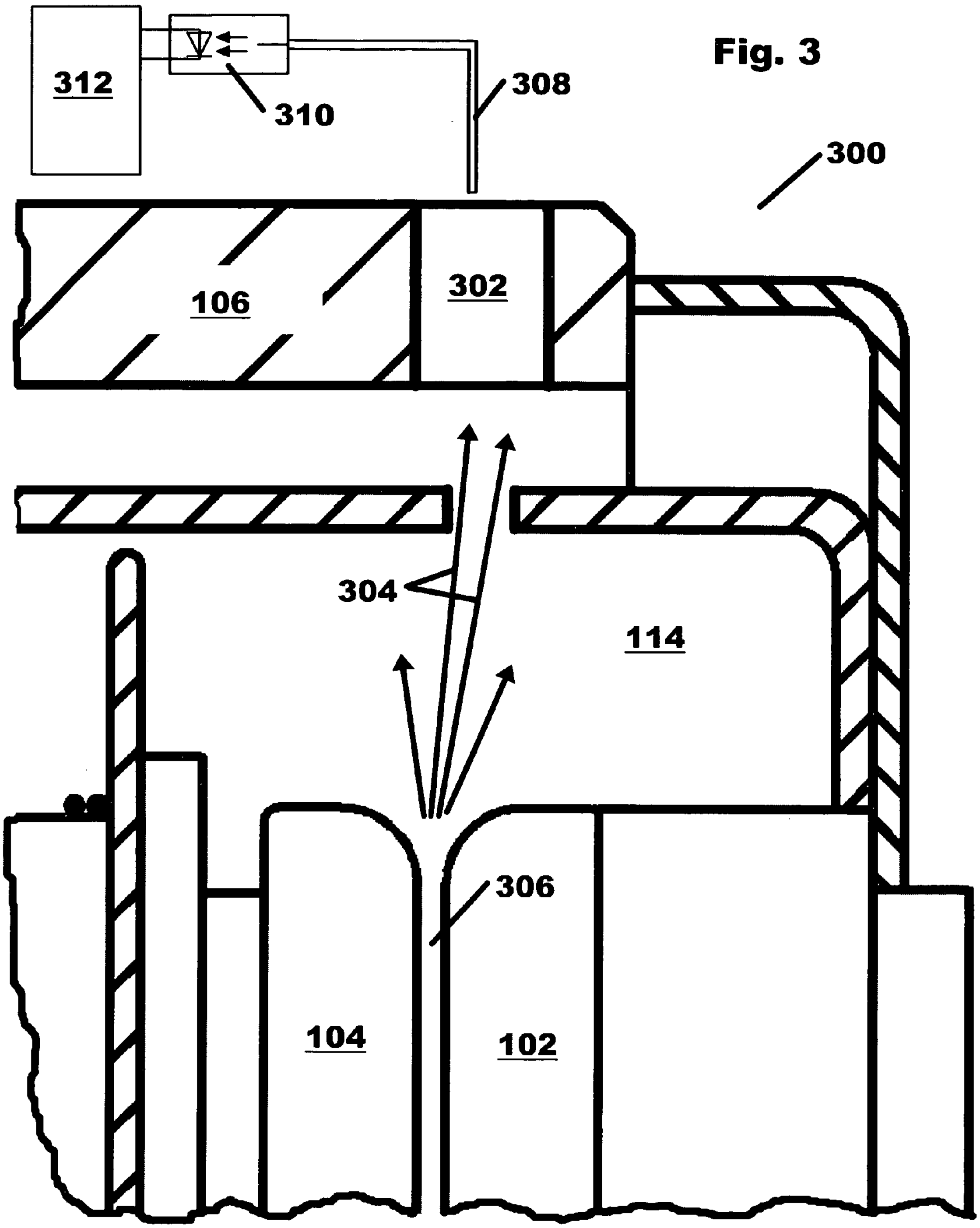
FIG. 3 is a partial cross sectional view of a device for detecting arcing contacts according to an embodiment of the present invention.

FIG. 3 is a partial cross sectional view 300 of a device for detecting arcing contacts according to an embodiment of the present invention. As the pressure in region 114 rises, arcing between contacts 104 and 102 will occur, due to the ionization of the gasses creating the increased pressure. An electrically isolated photo detector 310 is employed to observe the emitted light 304 generated in gap 306 as contacts 104 and 102 separate. Photo detector 310 may be a solid state photo diode or photo transistor type detector, or may be a photo-multiplier tube type detector. Due to cost considerations, a solid state device is preferred. The photo detector 310 is coupled to control and interface circuitry 312, which contains the necessary components (including computer processors, memory, analog amplifiers, analog to digital converters, or other required circuitry) needed to convert the signals from photo detector 310 to useful information. Photo detector 310 is optically coupled to a transparent window 302 by means of a fiber optic cable 308. Cable 308 provides the required physical and electrical isolation from the high operating voltage of the interrupter. Generally, cable 308 is comprised of an optically transparent glass, plastic or ceramic material, and is non-conductive. Window 302 is mounted in the enclosure for the interrupter, preferably in the insulator sleeve 106. Window 302 may also be mounted in the caps (for example 108) if convenient or required. Window 302 is made from an optically transparent material, including, but not limited to glass, quartz, plastics, or ceramics. Although not illustrated, it may be desirable to couple multiple cables 308 into a single photo detector 310 to monitor, for example, the status of any of three interrupters in a three phase contactor. Likewise, it may also be desirable to couple three photo detectors 310, each having a separate cable 308, into a single control unit 312. One advantage of the present embodiment, is that both the control unit 312 and/or photo detector 310 may be remotely located from the interrupter. This allows convenient monitoring of the interrupter without having to remove power from the circuit. It should be noted that elements 308, 310, and 312 are not to scale relative to the other elements in the figure.

Although the measurement of light 304 produced by the arcing of contacts 102, 104 is an indirect measurement of pressure in region 114, it is nonetheless a direct observation of the mechanism that produces failure within the interrupter. At sufficiently low pressure, no significant contact arcing will be observed because the background partial pressure will not support ionization of the residual gas. As the pressure rises, light generation from arcing will increase. Photo detector 310 may observe the intensity, frequency (color), and/or duration of the light emitted from the arcing contacts. Correlation between data generated by contact arcing under known pressure conditions can be used to develop a "trigger level" or alarm condition. Observed data generated by photo detector 310 may be compared to reference data stored in controller 312 to generate the alarm condition. Each of the characteristics of light intensity, light color, waveform shape, and duration may be used, alone or in combination, to indicate a fault condition. Alternatively, data generated from first principles of plasma physics may also be used as reference data.

Figure 4:
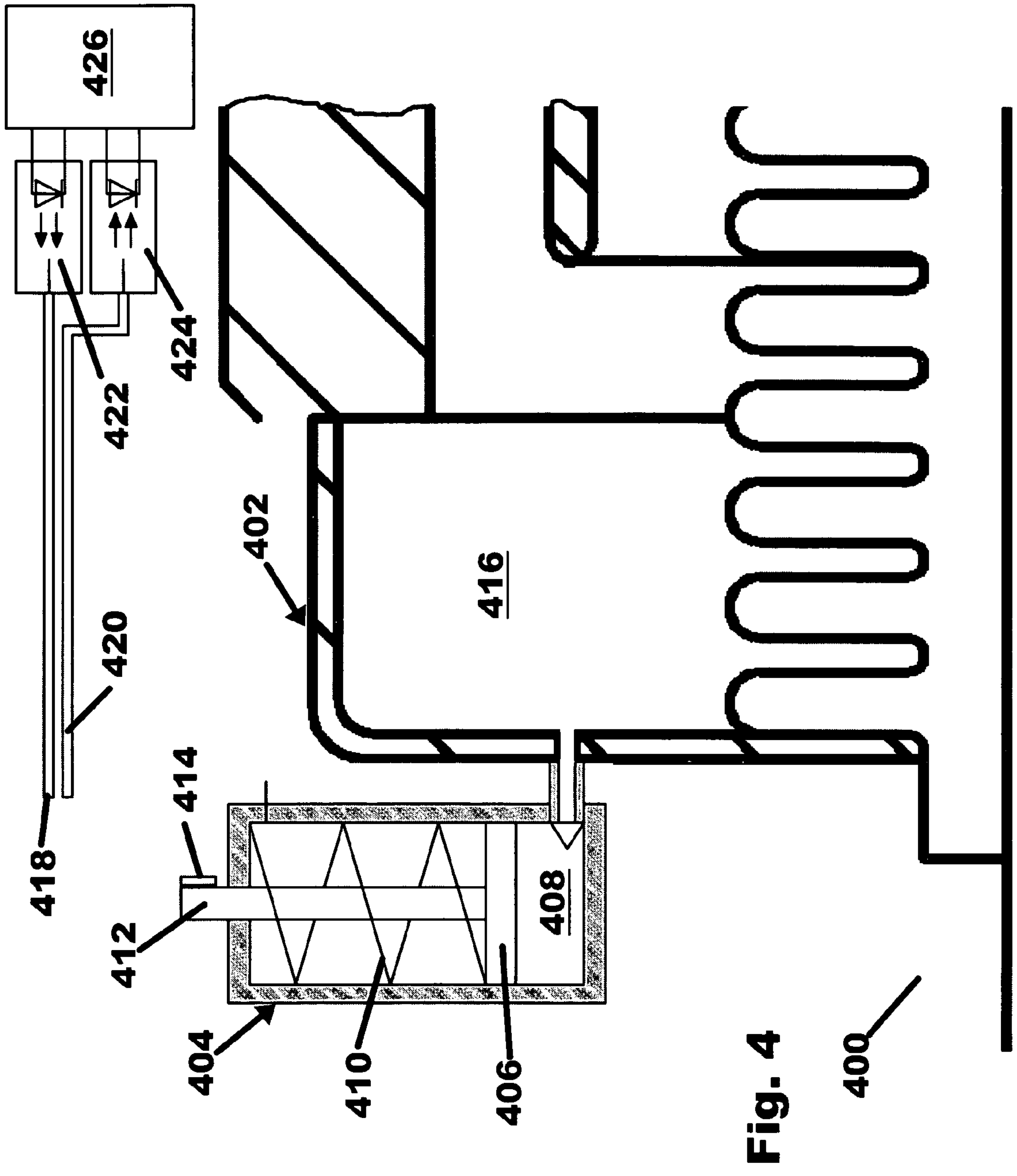
FIG. 4 is a partial cross sectional view of a cylinder actuated optical pressure switch in the low pressure state, according to an embodiment of the present invention.
Figure 5:
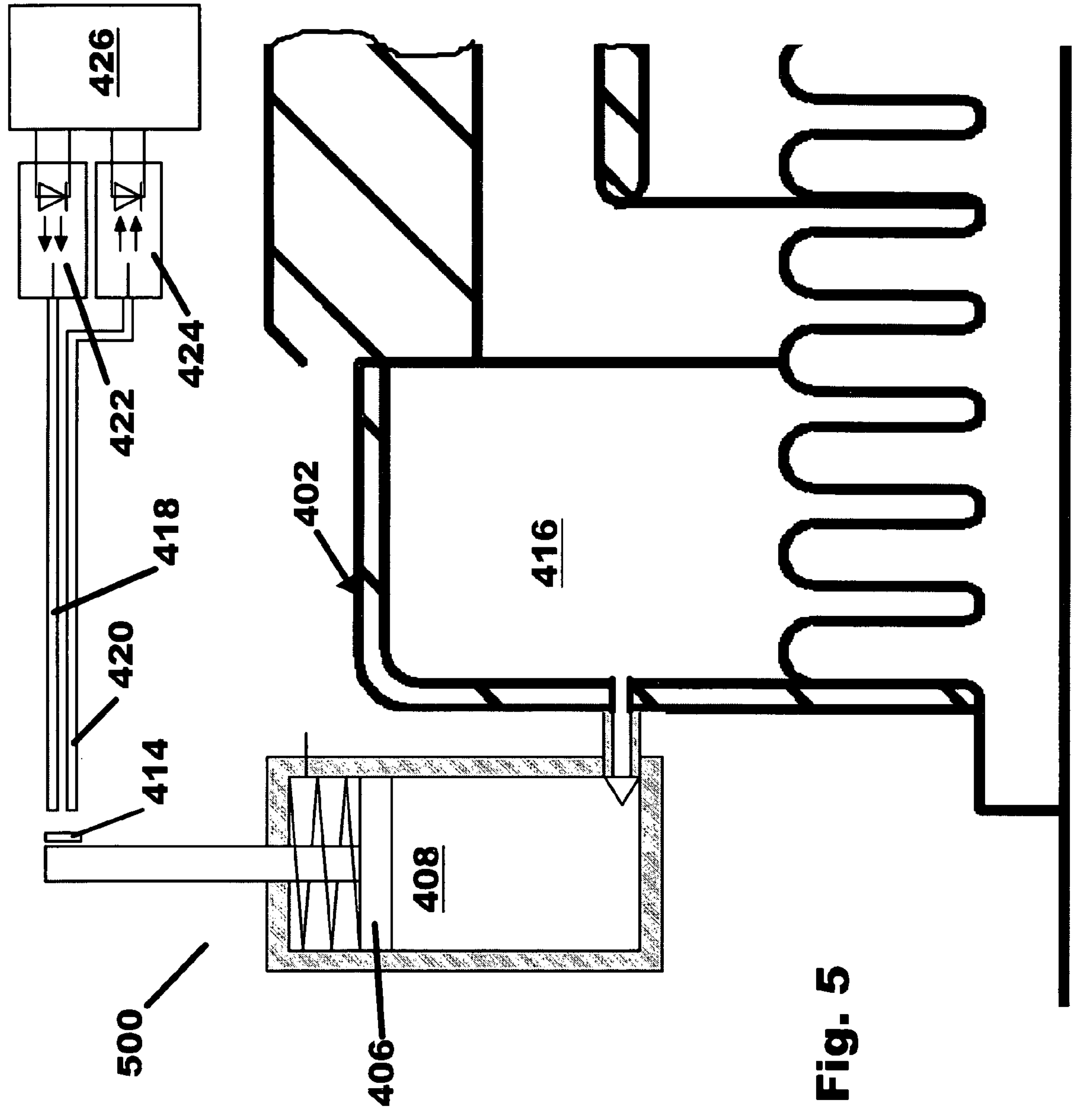
FIG. 5 is a partial cross sectional view of a cylinder actuated optical pressure switch in the high pressure state, according to an embodiment of the present invention.

FIG. 4 is a partial cross sectional view 400 of a cylinder actuated optical pressure switch 404 in the low pressure state, according to an embodiment of the present invention. FIG. 5 is a partial cross sectional view 500 of a cylinder actuated optical pressure switch 404 in the high pressure state, according to an embodiment of the present invention. In these embodiments, a pressure sensing cylinder device 404 comprises a piston 406 coupled to spring 410. Chamber 408 is fluidically coupled to the interior of interrupter 402 for sensing the pressure in region 416. A shaft 412 is attached to piston 406. Attached to shaft 412 is a reflective device 414, which may any surface suitable for returning at least a portion of the light beam emitted from optic cable 418 to optic cable 420. At low pressure, shaft 412 is retracted within cylinder 404, tensioning spring 410, as is shown in FIG. 4. Fiber optic cables 418 and 420, in concert with photo emitter 422, photo detector 424, and control unit 426, detect the position of shaft 412. At high pressure, spring 410 extends shaft 412 to a position where reflective device 414 intercepts a light beam originating from fiber optic cable 418 (via photo emitter 422), sending a reflected beam back to photo detector 424 via cable 420. An alarm condition is generated when photo detector 424 receives a signal, indicating a high pressure condition in interrupter 402. The pressure at which shaft 412 is extended to intercept the light beam is determined by the cross sectional area of piston 406 relative to the spring constant of spring 410. A stiffer spring will create an alarm condition at a lower pressure. Fiber optic cables 418 and 420 provide the necessary electrical isolation for the circuitry in devices 422-426. While the previous embodiments have shown the fiber optic cables transmitting and detecting a reflected beam, it should be evident that a similar arrangement can be utilized whereby the ends of each optical cable 418 and 420 oppose each other. In this case, the end of shaft 412 is inserted between the two cables, blocking the beam, when in the extended position. An alarm condition is generated when the beam is blocked.

Figure 6:
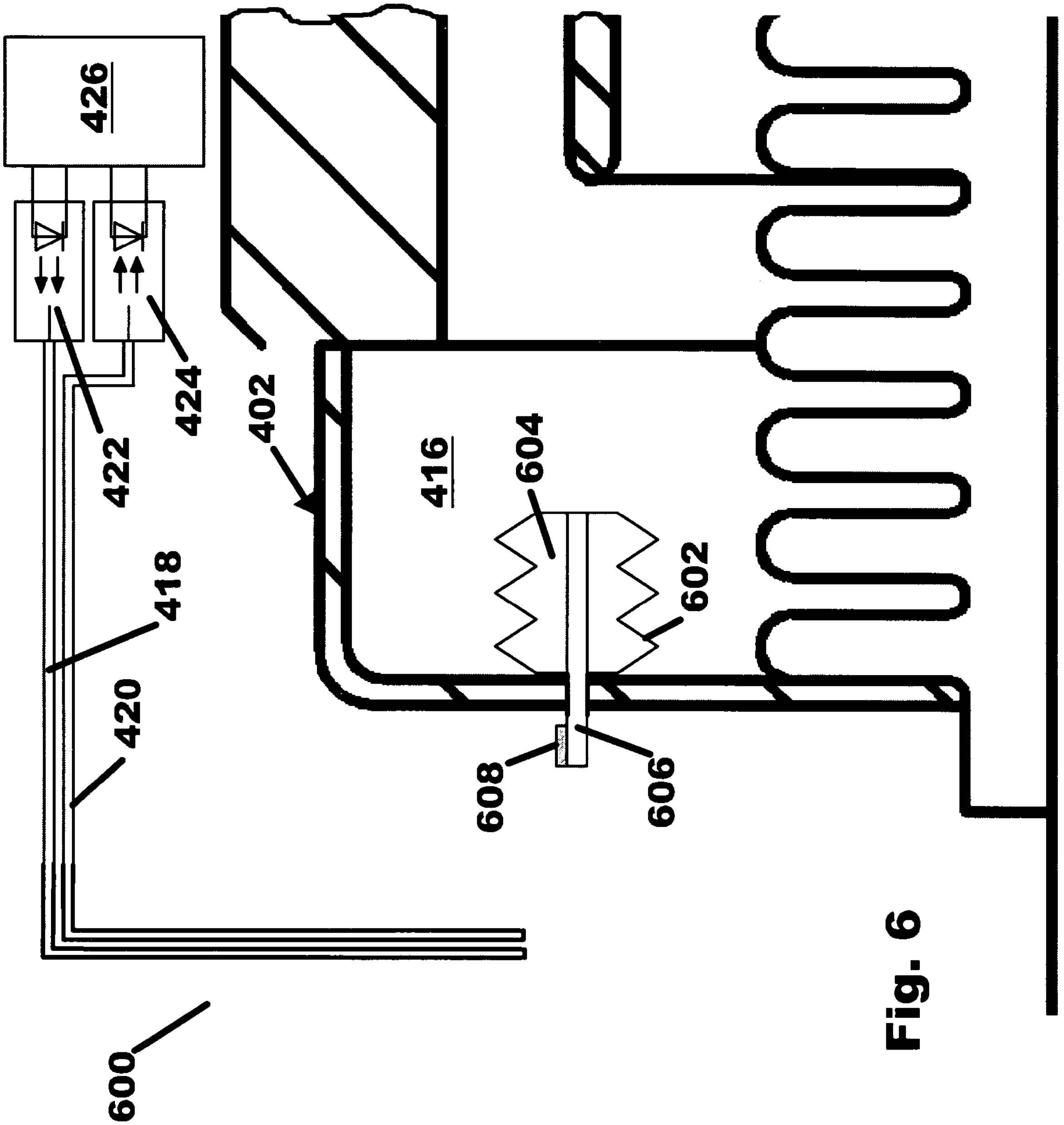
FIG. 6 is a partial cross sectional view of a bellows actuated optical pressure switch in the low pressure state, according to an embodiment of the present invention.
Figure 7:
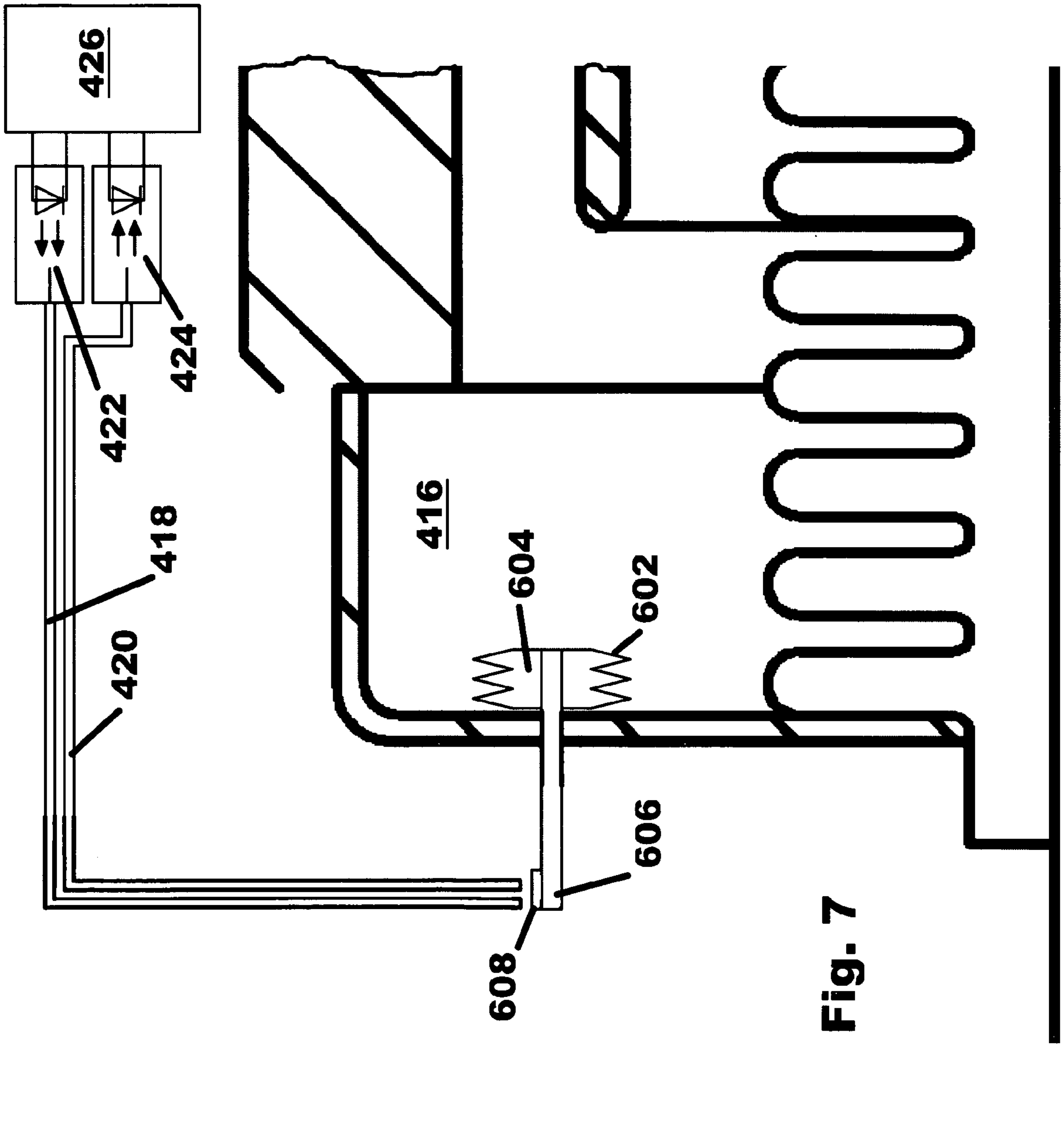
FIG. 7 is a partial cross sectional view of a bellows actuated optical pressure switch in the high pressure state, according to an embodiment of the present invention.

FIG. 6 is a partial cross sectional view 600 of a bellows actuated optical pressure switch in the low pressure state, according to an embodiment of the present invention. FIG. 7 is a partial cross sectional view of a bellows actuated optical pressure switch in the high pressure state, according to an embodiment of the present invention. Bellows 602 is mounted within interrupter 402, and is sealed against the inside wall of the interrupter such that a vacuum seal for the interior of the interrupter 402 is maintained. The inside volume 604 of the bellows is in fluid communication with the atmospheric pressure outside the interrupter. This can be accomplished by providing a large clearance around shaft 606 or an additional passage from the interior of the bellows 602 through the exterior wall of the interrupter (not shown). Bellows 602 is fabricated in such a manner as to be in the collapsed position shown in FIG. 7 when the pressure inside the bellows is equal to the pressure outside the bellows. When a vacuum is drawn outside the bellows, the bellows is extended toward the interior of region 416 of interrupter 420. At the alarm (high) pressure condition shown in FIG. 7, shaft 606 is extended, placing reflective device 608 in a position to intercept a light beam from cable 418, and reflect a least a portion of the beam back through cable 420 to detector 424. The "stiffness" of the bellows relative to its diameter, determines the alarm pressure level. A stiffer bellows material will result in a lower alarm pressure level. Fiber optic cables 418 and 420 provide the necessary electrical isolation for the circuitry in devices 422-426. While the previous embodiments have shown the fiber optic cables transmitting and detecting a reflected beam, it should be evident that a similar arrangement can be utilized whereby the ends of each optical cable 418 and 420 oppose each other. In this case, the end of shaft 606 is inserted between the two cables, blocking the beam, when in the extended position. An alarm condition is generated when the beam is blocked.

Figure 8:
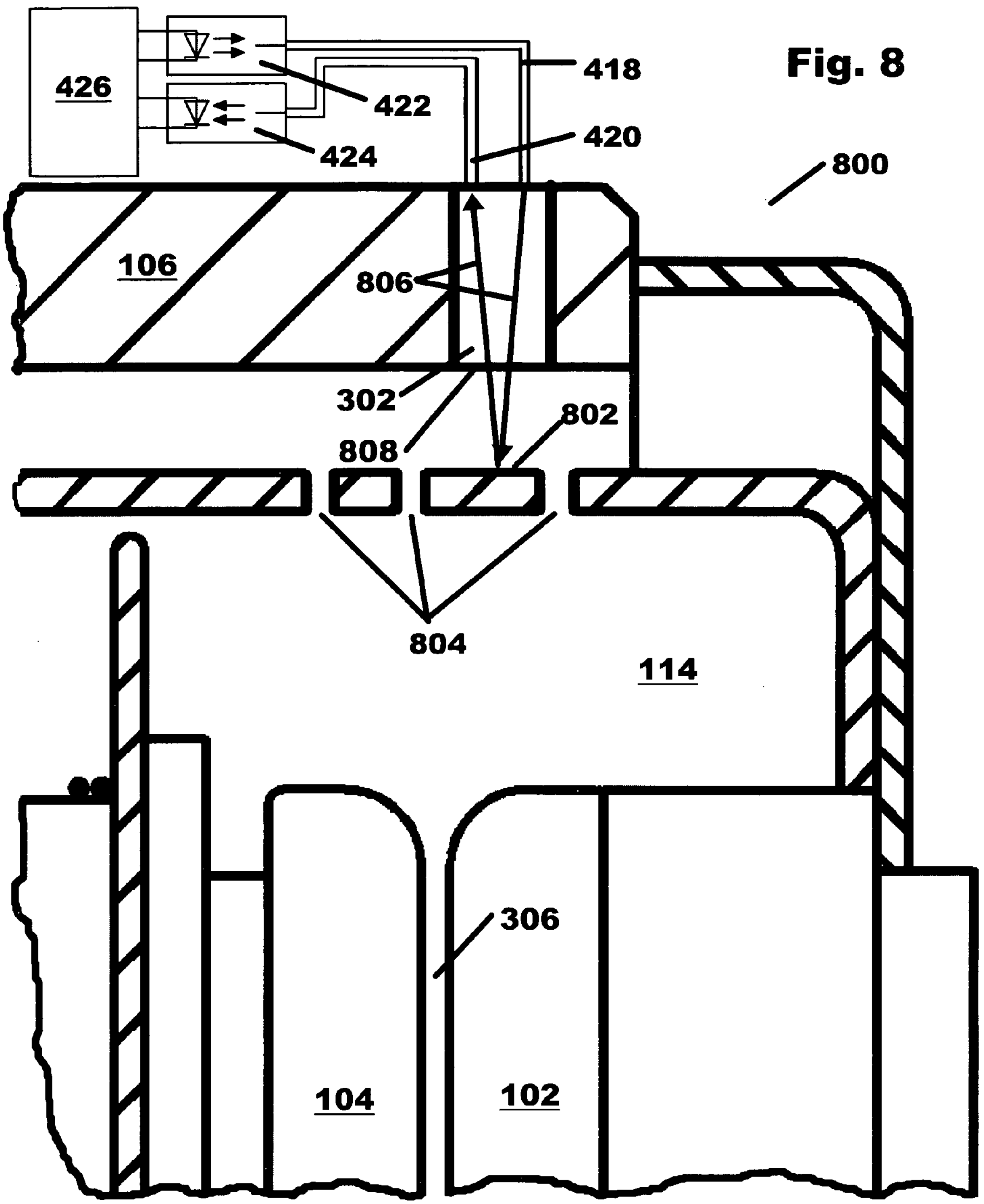
FIG. 8 is a partial cross sectional view of an optical device for detecting sputtered debris from the electrical contacts, according to an embodiment of the present invention.

FIG. 8 is a partial cross sectional view 800 of an optical device for detecting sputtered debris from the electrical contacts, according to an embodiment of the present invention. As the pressure increases inside the interrupter, arcing will occur in gap 306 between contacts 102 and 104. The arcing will "sputter" material from the contact surfaces, depositing this material on various interior surfaces. In particular, sputter debris will be deposited on surface 802, and on window 302 interior surface 808. A light beam emitted from optic cable 418 is transmitted through window 302 to reflective surface 802. Reflective surface 802 returns a portion of the beam to optic cable 420. The amount of sputtered debris on window surface 808 will determine the degree of attenuation of the light beam 806. If the beam is attenuated below a certain amount, an alarm is generated by control unit 426. Additionally, sputter debris may also cloud reflective surface 802, resulting in further beam attenuation. Ports 804 are placed in the vicinity of window 302, to aid in transporting any sputtered material to the window surface. This embodiment has the capability of providing a continuous monitoring function for detecting slow degradation of the vacuum inside the interrupter. Beam intensity can be continuously monitored and reported via controller 426, in order to schedule preventative maintenance as vacuum conditions inside the interrupter worsen.

Figure 9:
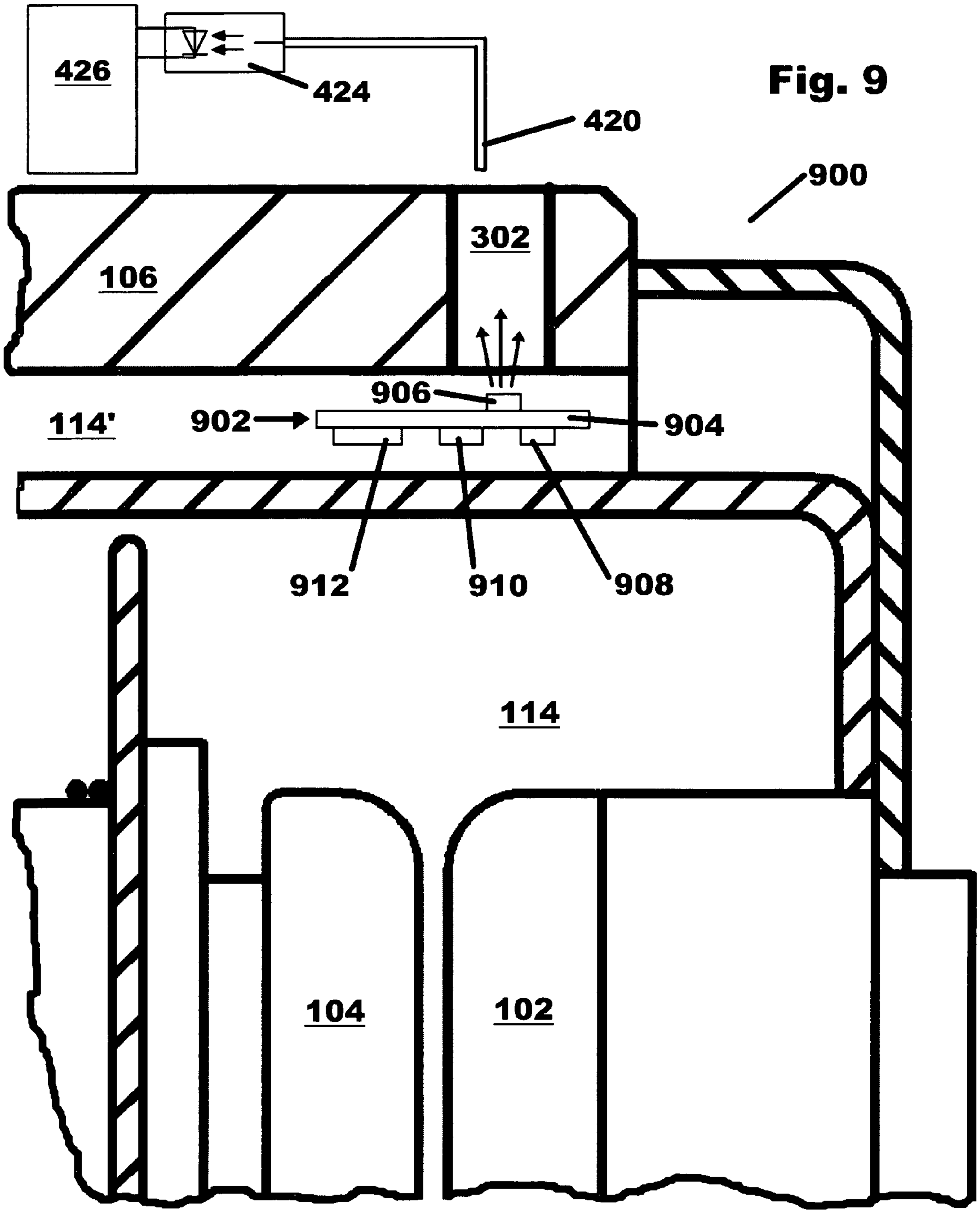
FIG. 9 is a partial cross sectional view of a self powered, optical transmission microcircuit, according to an embodiment of the present invention.

FIG. 9 is a partial cross sectional view 900 of a self powered, optical transmission microcircuit 902, according to an embodiment of the present invention. Microcircuit 902 contains a substrate 904, a photo transmission device 906, a pressure measurement component 908, amplifier and logic circuitry 910, and an inductive power supply 912. Microcircuit 902 can be a monolithic silicon integrated circuit; a hybrid integrated circuit having a ceramic substrate and a plurality of silicon integrated circuits, discrete components, and interconnects thereon; or a printed circuit board based device. The pressure within the interrupter in regions 114 and 114' are measured by a monolithic pressure transducer 908, interconnected to the circuitry on substrate 904. Amplifier and logic circuitry 910 convert signal information from the pressure transducer 908 for transmission by optical emitter device 906. The optical transmission from device 906 is delivered through window 302 to control unit 426 via optical cable 420, situated outside the interrupter. The optical transmission can be either analog or digital, preferably digital. Microcircuit 902 can deliver continuous pressure information, high pressure alarm information, or both. The inductive power supply 912 obtains its power from the oscillating magnetic fields within the interrupter. This is accomplished by placing a conductor loop (not shown) on substrate 904, then rectifying and filtering the induced AC voltage obtained from the conductor loop. Photo transmission device 906 can be a light emitting diode or laser diode, as is known to those skilled in the art. Construction of the components on substrate 904 can be monolithic or hybrid in nature. Since none of the circuitry in device 902 is referenced to ground, high voltage isolation is not required. High voltage isolation for devices 424, 426 is provided by optical cable 420, as described in previous embodiments of the present invention.

Figure 10:
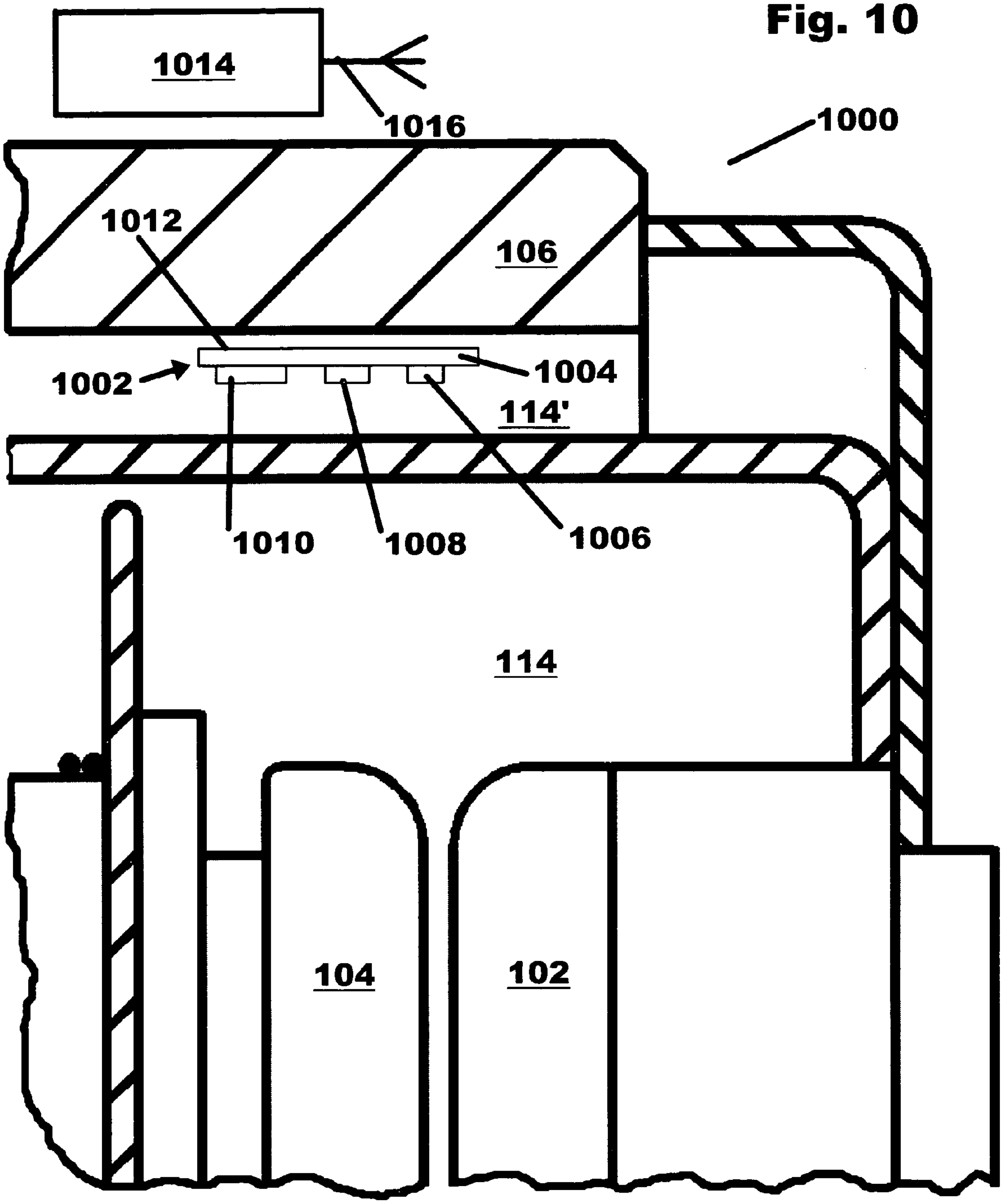
FIG. 10 is a partial cross sectional view of a self powered, RF transmission microcircuit, according to an embodiment of the present invention.

FIG. 10 is a partial cross sectional view 1000 of a self powered, RF transmission microcircuit 1002, according to an embodiment of the present invention. Microcircuit 1002 contains a substrate 1004; a pressure measurement component 1006; amplifier, logic, and RF transmission circuitry 1008; and an inductive power supply 1010. Microcircuit 1002 can be a monolithic silicon integrated circuit; a hybrid integrated circuit having a ceramic substrate and a plurality of silicon integrated circuits, discrete components, and interconnects thereon; or a printed circuit board based device. The pressure within the interrupter in regions 114 and 114' are measured by a monolithic pressure transducer 1006, interconnected to the circuitry on substrate 1004. Amplifier and logic circuitry convert signal information from the pressure transducer 1006 for transmission by an RF transmitter integrated within circuitry 1008. The RF transmission from device 906 is delivered through insulator 106 to receiver unit 1014, situated outside the interrupter. Various protocols and methods are suitable for RF transmission from integrated circuitry, as are well known to those skilled in the art. For purposes of this disclosure, RF transmission includes microwave and millimeter wave transmission. Receiver unit 1014 may be located at any convenient distance from the interrupter, within range of the transmitter contained within microcircuit 1002. Receiver unit may set up to monitor the transmissions from one or a plurality of microcircuits resident in multiple interrupter devices. Unit 1014 contains the necessary processors, memory, analog circuitry, an interface circuitry to monitor transmissions and issues alarms and other information as required. The inductive power supply 1010 obtains its power from the oscillating magnetic fields within the interrupter. This is accomplished by placing a conductor loop (not shown) on substrate 1004, then rectifying and filtering the induced AC voltage obtained from the conductor loop.

Figure 11:
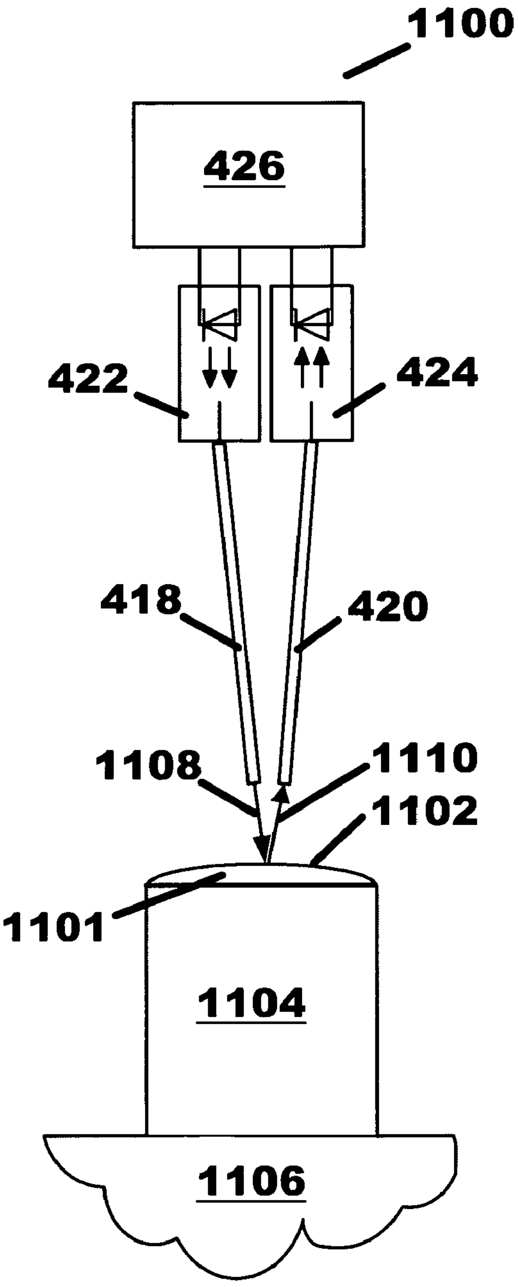
FIG. 11 is a schematic view of a diaphragm actuated optical pressure switch in the low pressure state, according to an embodiment of the present invention.
Figure 12:
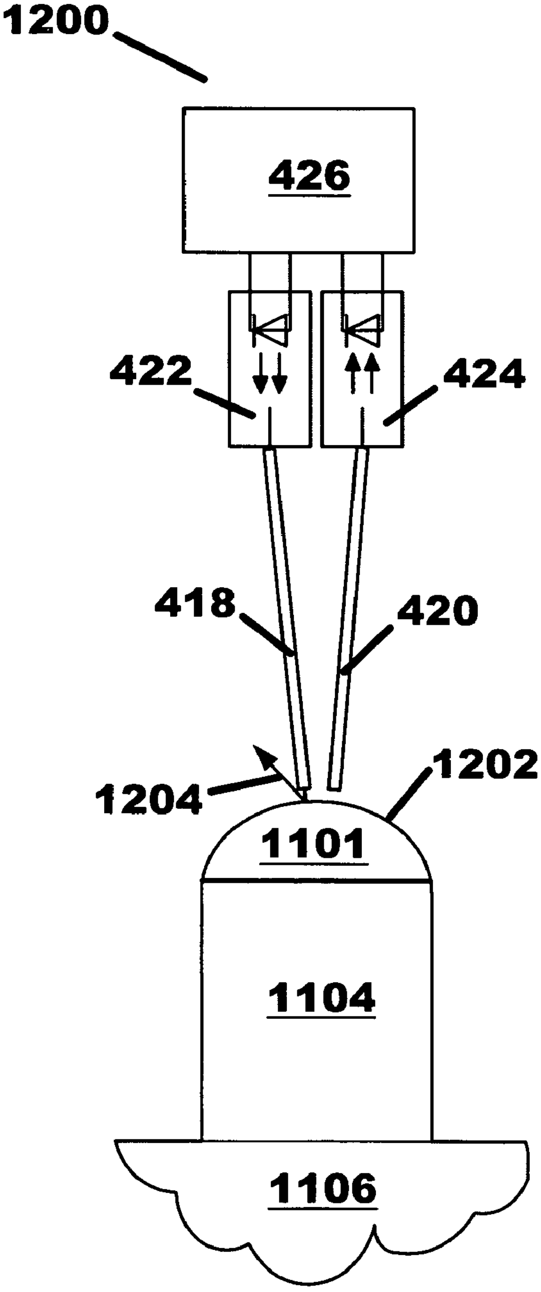
FIG. 12 is a schematic view of a diaphragm actuated optical pressure switch in the high pressure state, according to an embodiment of the present invention.

FIG. 11 is a schematic view 1100 of a diaphragm actuated optical pressure switch in the low pressure state, according to an embodiment of the present invention. FIG. 12 is a schematic view 1200 of a diaphragm actuated optical pressure switch in the high pressure state, according to an embodiment of the present invention. A low cost alternative embodiment for detecting high pressures within the interrupter can be obtained through use of a diaphragm 1101. Diaphragm 1101 is fixed to structure 1104, which is generally hollow and tubular in shape. Structure 1104 is in turn fastened to a portion of interrupter segment 1106. Alternatively, diaphragm 1101 could be attached directly to an outer surface of the interrupter, if convenient. Due to the fragile nature of the thin dome material, structure 1104 acts as a weld or braze interface to the thicker metal structure of the interrupter. Possibly, structure 1104 could be brazed to a port in the insulator section (for example, ref 106 in prior figures) as well. At low pressures inside the interrupter, dome 1101 would reside in the collapsed position, as shown in FIG. 11. At high pressure, dome 1101 would be in the extended position of FIG. 12. The pressures at which the dome transitions from the collapsed position to the extended position would be within the range of 2 to 14.7 psia, preferably between 2 and 7 psia. The dome position is detected by components 418-426. In the low pressure state, the collapsed dome produces a relatively flat surface 1102. A light beam generated by emitter device 422 is transmitted to surface 1102 via optical cable 418. A reflected beam is returned from surface 1102 to optical detector device 424 via optical cable 420. At a high pressure condition, the dome snaps into an approximately hemispherical expanded shape, having significant curvature in its surface 1202. This curvature deflects the light beam emitted from the end of optical cable 418 away from the receiving end of cable 420, causing a loss of signal at detector 424, and generating an alarm condition within the circuitry of device 426. It is also be possible to reverse the logic by using optical cables 418 and 420 to detect the near proximity of the dome in its extended position, creating a loss of signal when its pulled down into an approximately flat position. Alternatively, the position of the dome may be detected by a mechanical shaft (not shown) placed in contact with the dome's outer surface, the opposite end of the shaft intercepting and optical beam as is shown in the embodiments of FIGS. 4-7.

Figure 13:
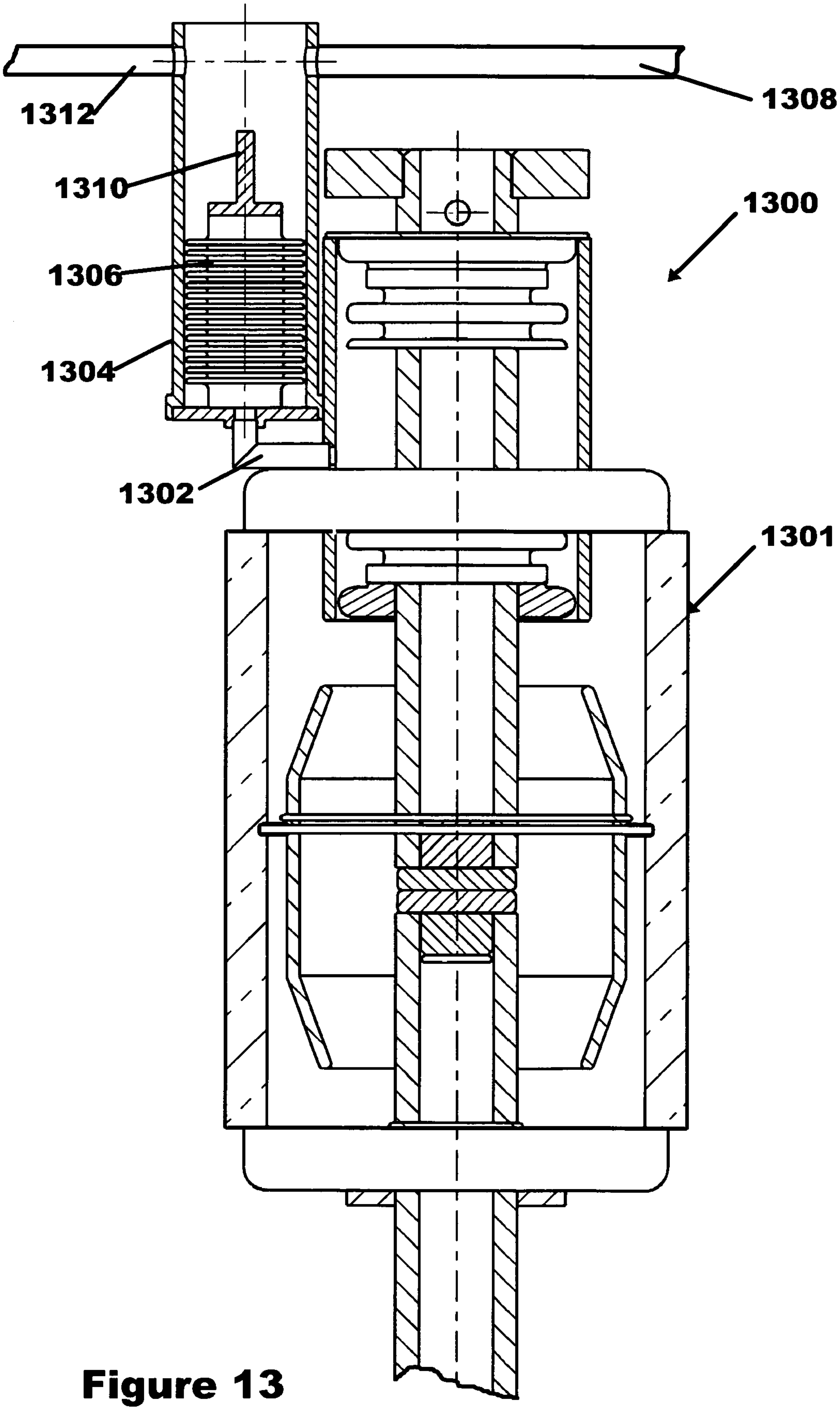
FIG. 13 is a partial cross sectional view of a high voltage vacuum switch with an externally mounted pressure sensing bellows and a transmission optical detector, according to an embodiment of the present invention.

FIG. 13 is a partial cross sectional view 1300 of a high voltage vacuum switch 1301 with an externally mounted pressure sensing bellows 1306 and a transmission optical detector, according to an embodiment of the present invention. This embodiment allows the measurement of a high pressure condition (or loss of vacuum) utilizing an externally mounted bellows container 1306, which is in fluid communication with the internal pressure of vacuum switch 1301 via connecting tube 1302. Bellows container 1306 is designed to be extended in length at higher internal pressures, and contracted in length at low internal pressures. The spring force required for the extension of the bellows may be provided by springs situated inside or external to bellows 1306 (not shown), and attached to the bellows by methods known to those skilled in the art. Preferably, the bellows container 1306 is constructed in a manner wherein the extension spring force is built in to the bellows container's wall structure, either by the material chosen or by method of fabrication, or both. Optionally, the extension of bellows container 1306 may be tuned or modified by the addition of external springs, directed to enhance or oppose the extension, so as to optimize the response for a specific vacuum switch pressure range, or to compensate for various atmospheric pressure conditions (not shown). Bellows container 1306 may be constructed of any suitable gas impermeable material, including plastics, glass, quartz, and metals. Preferably, metals are used. More preferably, stainless steel alloy 321 or alloys of nickel are used. Alignment device 1304 aids in housing bellows container 1306 and provides support for attachment of optical transmission devices 1312 and 1308. Optical transmission devices 1312 and 1308 are preferably fiber optic cable, constructed of dielectric materials such as plastic, ceramic, or glass, or their combination. Structure 1310, affixed to one end of bellows container 1306, moves in response to the extension of bellows 1306. At low pressures (high vacuum) inside switch 1301, bellows container 1306 is in a compressed (non-extended) state, wherein structure 1310 is positioned such that the optical path between transmission devices 1312 and 1308 is unobstructed, allowing transmission of a light beam there between. At high pressures (low vacuum), bellows container 1306 is extended in length, moving structure 1310 into the light path between transmission devices 1312 and 1308, blocking or attenuating the light beam. The detection of the blocked light beam may be provided by, for example, photo emitter 422, photo detector 424, and control unit 426 (not shown) in embodiments previously disclosed.

Figure 14:
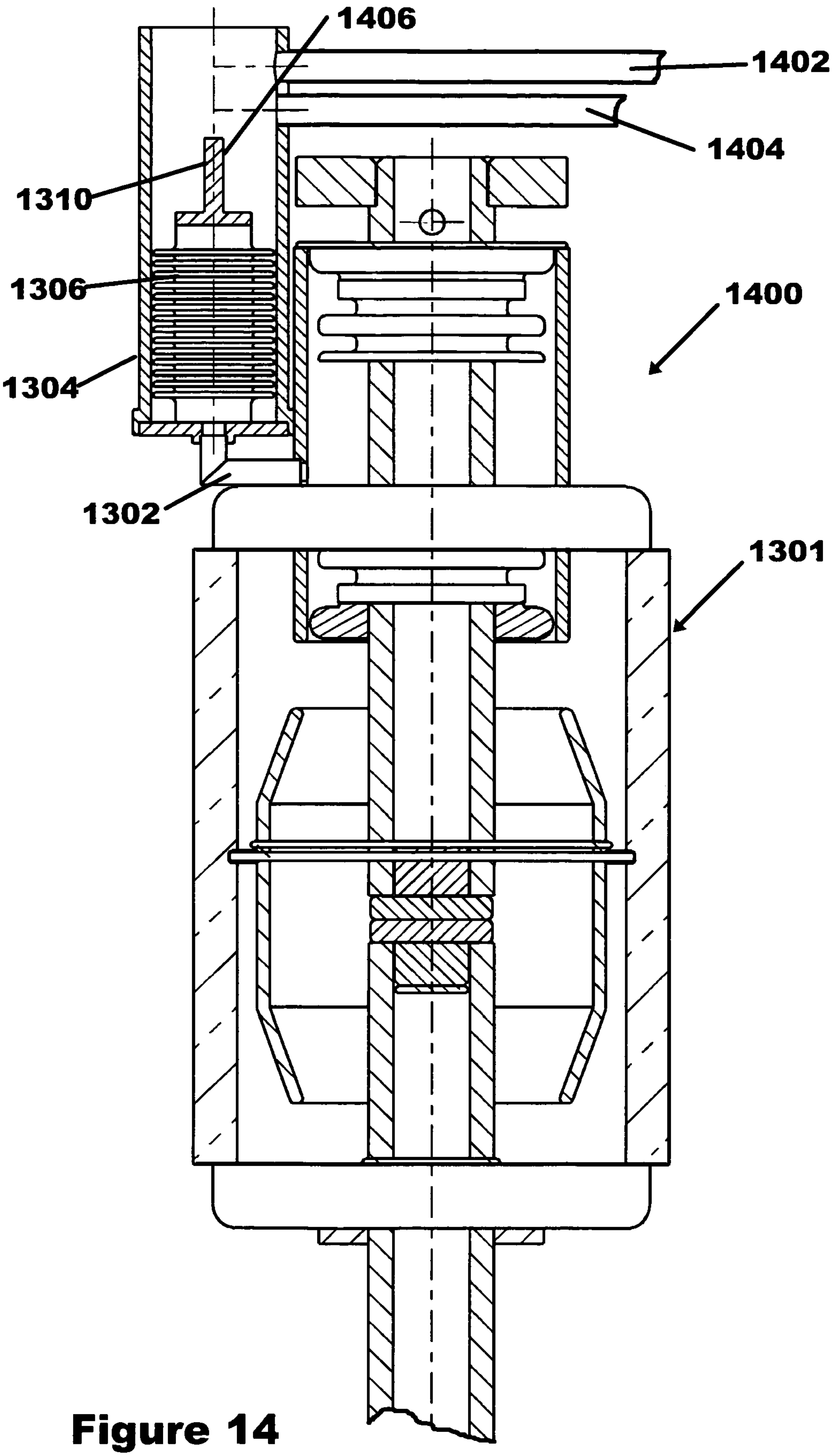
FIG. 14 is a partial cross sectional view of a high voltage vacuum switch with an externally mounted pressure sensing bellows and a reflective optical detector, according to an embodiment of the present invention.

FIG. 14 is a partial cross sectional view 1400 of a high voltage vacuum switch 1301 with an externally mounted pressure sensing bellows 1306 and a reflective optical detector, according to an embodiment of the present invention. Optical transmission devices 1402 and 1404 are mounted in alignment device 1304. In this particular embodiment, structure 1310 comprises a reflective surface 1406. When bellows 1306 is extended at a high pressure condition, reflective surface 1406 is placed in a position to reflect a light beam emanating from one optical transmission device (for example, 1402) into the other optical transmission device (for example, 1404). The detection of the transmitted light beam between devices 1402 and 1404 may be provided by, for example, photo emitter 422, photo detector 424, and control unit 426 (not shown) in embodiments previously disclosed. Optical transmission devices 1402 and 1404 are preferably fiber optic cable, constructed of dielectric materials such as plastic, ceramic, or glass, or their combination.

Figure 15:
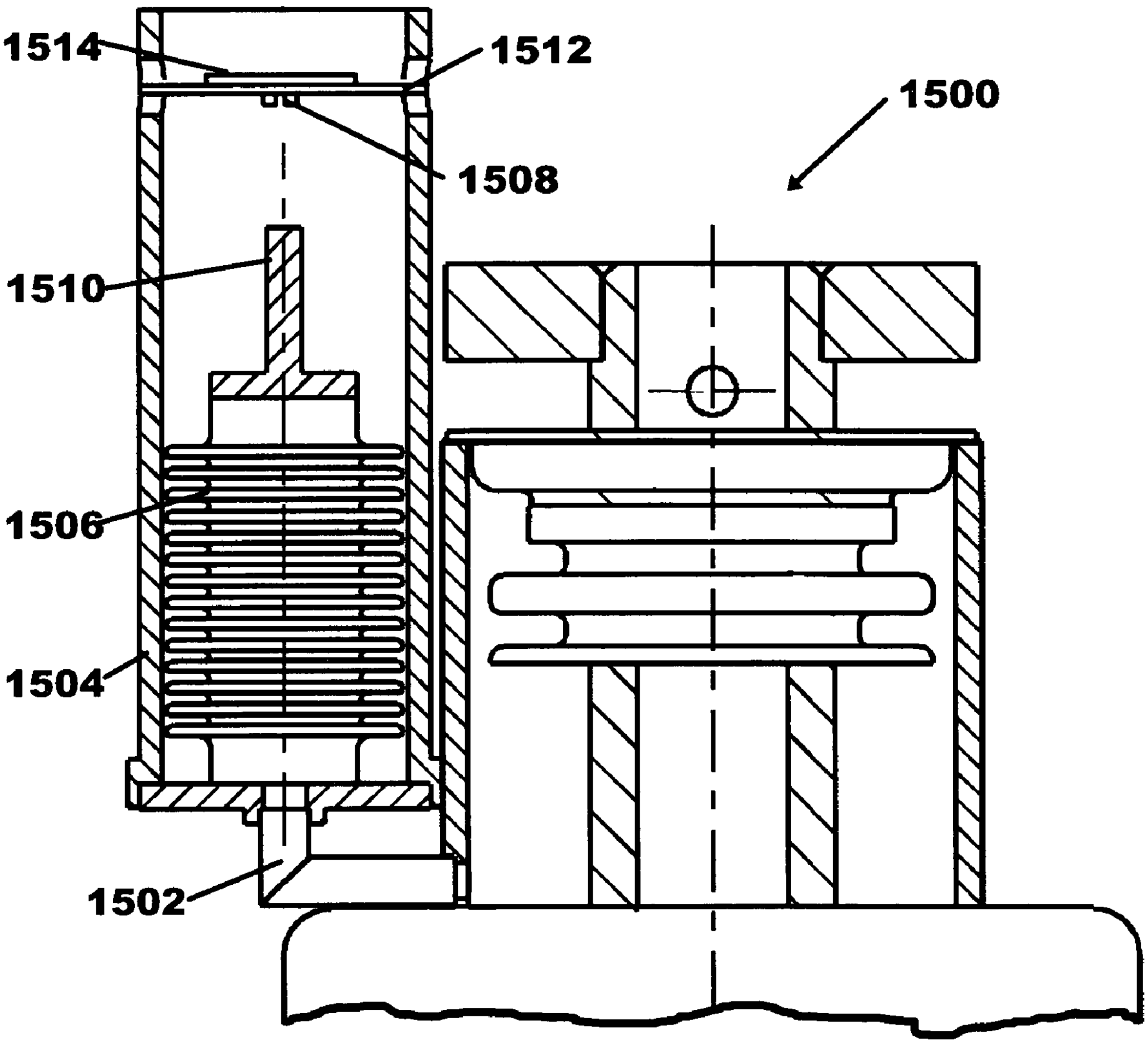
FIG. 15 is a partial cross sectional view of a high voltage vacuum switch with an externally mounted pressure sensing bellows and a contact closure sensing microcircuit, according to an embodiment of the present invention.

FIG. 15 is a partial cross sectional view 1500 of a high voltage vacuum switch with an externally mounted pressure sensing bellows 1506 and a contact closure sensing microcircuit 1514, according to an embodiment of the present invention. Bellows container 1506 is designed to be extended in length at higher internal pressures, and contracted in length at low internal pressures. The spring force required for the extension of the bellows may be provided by springs situated inside or external to bellows 1506 (not shown), and attached to the bellows by methods known to those skilled in the art. Preferably, the bellows container 1506 is constructed in a manner wherein the extension spring force is built in to the bellows container's wall structure, either by the material chosen or by method of fabrication, or both. Optionally, the extension of bellows container 1506 may be tuned or modified by the addition of external springs, directed to enhance or oppose the extension, so as to optimize the response for a specific vacuum switch pressure range, or to compensate for various atmospheric pressure conditions (not shown). Bellows container 1506 may be constructed of any suitable gas impermeable material, including plastics, glass, quartz, and metals. Preferably, metals are used. More preferably, stainless steel alloy 321 or alloys of nickel are used. Alignment device 1504 aids in housing bellows 1506 and provides support for attachment of microcircuit 1514 attached to micro circuit support 1512. Structure 1510, affixed to one end of bellows container 1306, moves in response to the extension of bellows 1506. If the bellows is constructed of a non-conductive or dielectric material, structure 1510 is preferably constructed of a electrically conductive material which is bonded to the remaining bellows 1506 using adhesives, glues, press fitting, or any other suitable attachment technique known in the art. Structure 1510 may also be constructed of a non-conductive base material whose upper surface is plated with a conductor utilizing a suitable coating process, such as electroplating or vapor deposition. Electrical contacts 1508, electrically coupled to microcircuit 1514, are positioned to detect the extended position of bellows 1506 (a high pressure condition) when the conductive surface of structure 1510 engages two or more contacts, causing electric current flow in microcircuit 1514 which can be detected by methods well known to those skilled in the art.

Microcircuit 1514 contains a power supply, communication/transmission circuitry, and current sensing circuitry. Microcircuit 1514 is of suitable construction, such as a monolithic silicon integrated circuit; a hybrid integrated circuit having a ceramic substrate and a plurality of silicon integrated circuits, discrete components, and interconnects thereon; or, a printed circuit board based device with through hole or surface mounted components. The power supply is of a suitable construction, such as an inductive device, deriving power from either the current flowing in the high voltage vacuum switch (as previously disclosed in embodiments above), or preferably an RF device receiving power from an external RF source transmitting RF signals to the device. Use of an external RF power transmission source allows the microcircuit to remain dormant until queried, and can be utilized even if the vacuum switch is powered down, offline, or in storage. Alternatively, power may be supplied by batteries, solar cells, or other suitable power sources that can be integrated within microcircuit 1514 or attached to support 1512. The communication/transmission circuitry can be RF transmission based or optical transmission based. RF transmission includes microwave and millimeter wave transmission. Optical transmission may be accomplished with solid state light sources integrated within microcircuit 1514 or attached to substrate 1512 (not shown). An optical receiving device (not shown), such as the embodiments shown in FIG. 9, may be utilized to detect optical transmissions from microcircuit 1514. Such a receiver can be coupled to circuit 1514 directly with optical cable, or be positioned to pick up transmissions by line of sight. An RF receiver unit (not shown) may be located at any convenient distance from the vacuum switch, within range of the transmitter contained within microcircuit 1514. The RF receiver unit may or may not contain RF transmission capability. Both types of receiver units (optical or RF) may set up to monitor the transmissions from one or a plurality of microcircuits resident in multiple high voltage vacuum devices, and may be stationary or mobile. Receivers contain the necessary processors, memory, analog circuitry, an interface circuitry to monitor transmissions and issues alarms and other information as required. Microcircuit 1514 can be programmed to immediately transmit a signal when a high pressure is sensed in the vacuum switch, or wait until circuit 1514 is queried by a signal transmitted to it. On main advantage of the present embodiment is that microcircuit 1514 is floating at the potential of the vacuum switch, and that transmission of information (and power) to and from the microcircuit is not compromised by high voltage potentials in the switch.

Figure 16:
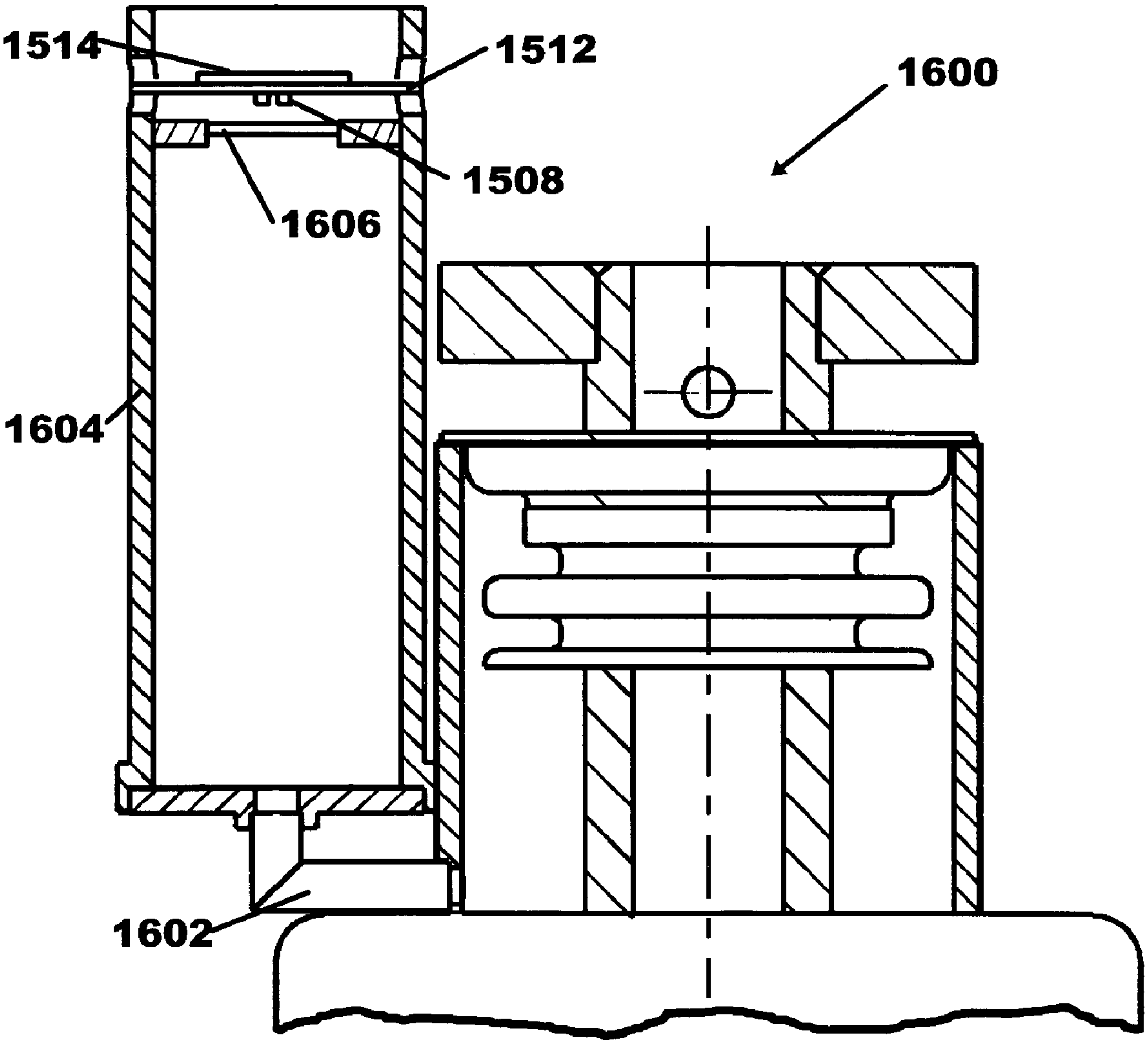
FIG. 16 is a partial cross sectional view of a high voltage vacuum switch with an externally mounted pressure measuring chamber and a contact closure sensing microcircuit, at low pressure, according to an embodiment of the present invention; and, FIG. 17 is a partial cross sectional view of a high voltage vacuum switch with an externally mounted pressure measuring chamber and a contact closure sensing microcircuit, at high pressure, according to an embodiment of the present invention.
Figure 17:
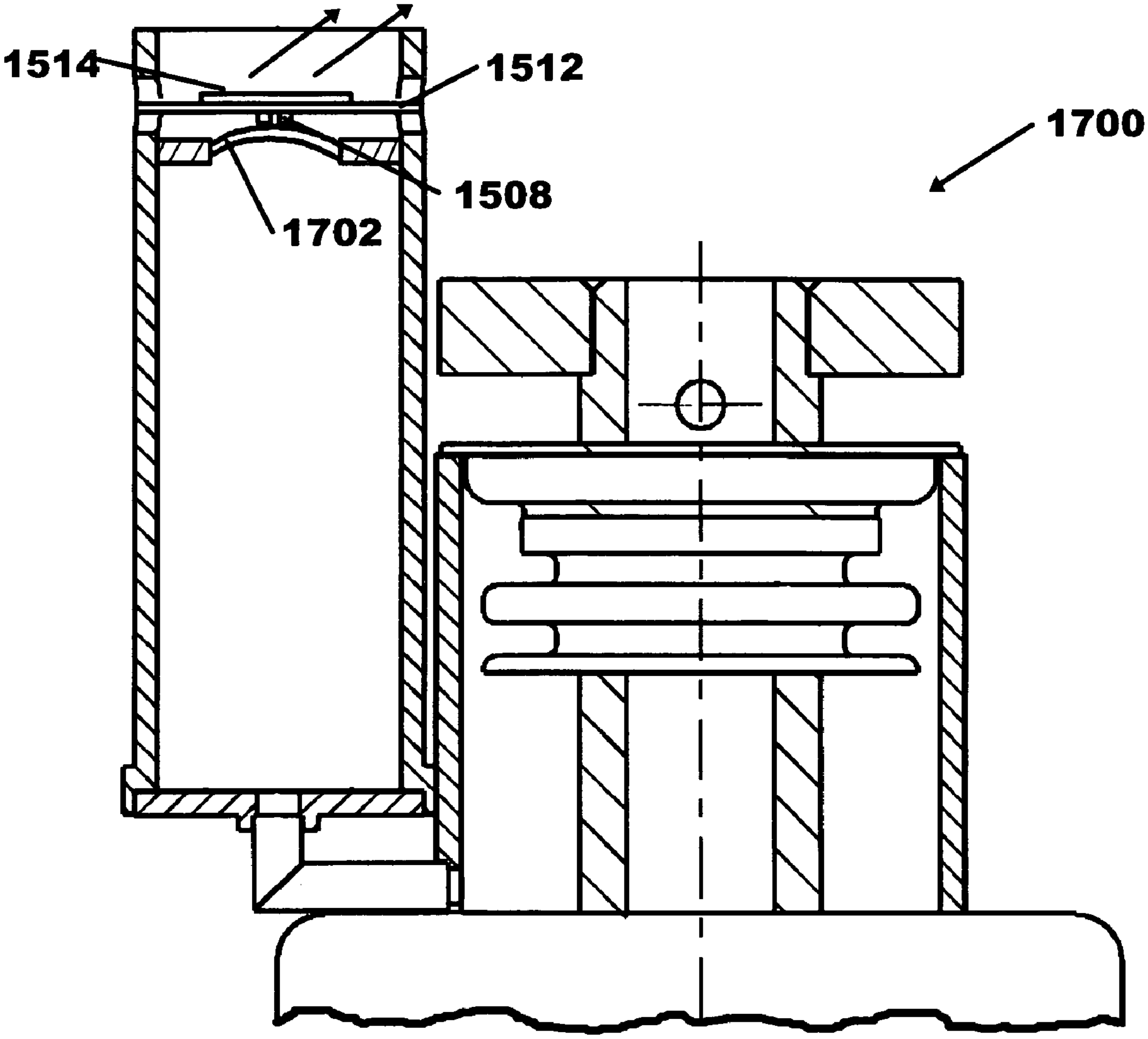

FIG. 16 is a partial cross sectional view 1600 of a high voltage vacuum switch with an externally mounted pressure measuring chamber 1604 and a contact closure sensing microcircuit 1514, at low pressure, according to an embodiment of the present invention. FIG. 17 is a partial cross sectional view 1700 of a high voltage vacuum switch with an externally mounted pressure measuring chamber 1604 and a contact closure sensing microcircuit 1514, at high pressure, according to an embodiment of the present invention. Pressure measuring chamber 1604 is fluidically coupled to the pressure inside of the high voltage vacuum switch via conduit 1602. A movable structure 1606 is placed within a portion of the containment walls of chamber 1604. Movable structure 1606 deflects outwardly (ref 1702) at high pressures within chamber 1604. Structure 1606 is generally a thin diaphragm or membrane, constructed of any suitable material, preferably metal or a non-metallic material having an upper coating of metal or other electrically conductive material. Contacts 1508 are placed in close proximity to structure 1606, so that small deflections can be detected by electrical continuity through at least two contacts. Structure 1606 is fabricated in such a manner as to produce a dome shape at low differential pressures. As pressure outside the dome increases (or pressure inside the dome decreases), the dome is forced into an approximately planar shape. The amount of deflection for a given pressure differential is dependent on the wall thickness, type of material, and other material properties as is well known in the art. An advantage to this embodiment is that very small deflections can be detected by placing substrate 1512 in near contact with structure 1606, resulting in increased pressure sensitivity.

The description and limitations of microcircuit 1514 have been recited above.

In an alternative embodiment of the present invention, the deflection of movable structure 1606 is detected by a strain gauge device fixed to the outer surface of structure 1606 (not shown). Microcircuit 1514 contains the power supply and communication/transmission circuitry previously disclosed, the contact closure sensing circuitry being replaced with the appropriate circuitry for interface with the strain gauge device. The strain gauge device may be connected to microcircuit 1514 by wires, or communication with microcircuit 1514 may by wireless techniques such as optical transmission or RF transmission. Alternatively, the strain gauge device may be integrated with other circuitry, such as power supply and transmission/reception circuitry, on the same substrate, which is fixed to the surface of structure 1606. An advantage to this embodiment of the present invention is that very small deflections can be detected, providing a high sensitivity to pressure changes within the high voltage vacuum device. This embodiment also allows continuous (or periodic) measurement and monitoring of the pressure as a function of time, which can be utilized to provide advance warning of potential failure conditions, allowing users to take pro-active action to identify and remove leaking devices from service prior to actual failure.

The present invention is not limited by the previous embodiments or examples heretofore described. Rather, the scope of the present invention is to be defined by these descriptions taken together with the attached claims and their equivalents.

What is claimed is:

1. A vacuum bottle-type electrical device with a vacuum pressure loss detection feature comprising:

a bottle defining a vacuum pressure condition at the interior of the bottle;

electrical charge members in the bottle mounted for relative movement between a first position in which the electrical charge members are positioned closely adjacent and an second position in which the electrical charge members are spaced apart from each other, with the vacuum pressure condition in the bottle preventing electrical arcing between the electrical charge members when they are moved between their first and second positions at voltage potentials in excess of 1000V;

a movable structure associated with the bottle having first and second sides, with the movable structure being exposed to the vacuum pressure condition in the bottle at the first side of the movable structure and to a second pressure condition exterior to the bottle at the second side of the movable structure, with the movable structure moving in response to the loss of the vacuum pressure condition in the bottle; and a monitor for sensing movement of the movable structure to detect loss of the vacuum pressure condition in the bottle when the electrical charge members are in either their first or second positions.

2. The device of claim 1 wherein the movable structure is a rigid member mounted for movement relative to the bottle in response to the loss of the vacuum condition in the bottle.

3. The device of claim 1 wherein the movable structure is a flexible member affixedly mounted, with the movable structure changing its shape configuration in response to the loss of the vacuum pressure condition in the bottle.

4. The device of claim 1 wherein the movable structure is a bellows device mounted for movement relative to the bottle in response to the loss of the vacuum condition in the bottle.

5. The device of claim 1 wherein the monitor comprises a light source and a light detection sensor.

6. The device of claim 5 wherein the light source, light detection sensor and movable structure are arrange so that movement of the movable structure in response to the loss of the vacuum pressure condition in the bottle blocks the transmission of light from the light source to the light detection sensor.

7. The device of claim 5 wherein light source, light detection sensor and movable structure are arrange so that movement of the movable structure in response to the loss of the vacuum pressure condition in the bottle enables transmission of light from the laser light source to the light detection sensor.

8. The device of claim 1 wherein the monitor generates a signal upon detecting loss of the vacuum pressure condition in the bottle.

9. The device of claim 8 wherein the monitor generates the signal upon a partial loss of the vacuum pressure condition in the bottle.

10. The device of claim 8 wherein the monitor generates the signal only upon a full loss of the vacuum pressure condition in the bottle.

11. The device of claim 8 wherein the signal is communicated from the monitor via an RF communication link.

12. The device of claim 8 wherein the signal is communicated from the monitor via fiber optic cable.

13. The device of claim 1 wherein the monitor comprises a sensor mounted on the movable structure for sensing movement of the movable structure and generating a signal in response to the movement of the movable structure indicative of the loss of the vacuum pressure condition in the bottle.

14. The device of claim 13 wherein the sensor comprises points of mechanical contact that are connected electrically upon movement of the movable structure in response to the loss of vacuum pressure condition in the bottle.

15. The device of claim 1 wherein the electrical charge members comprise electrical contact points, and the device constitutes a switching mechanism.

16. The device of claim 1 wherein the electrical charge members comprise capacitor plates for storing charge, and the device constitutes a capacitor.

17. A method for detecting loss of vacuum in a vacuum pressure-type electrical device comprising a bottle for defining a vacuum pressure condition at the interior of the bottle, and electrical charge members in the bottle mounted for relative movement between a first position in which the electrical charge members are positioned closely adjacent and a second position in which the electrical charge members are spaced apart, with the vacuum in the bottle preventing electrical arcing between the electrical charge members when they are moved between their first and second positions at voltage potentials in excess of 1000 volts, the method comprising:

operatively associating a movable structure having first and second sides with the bottle;

exposing the first side of the movable structure to the vacuum pressure condition in the bottle;

exposing the second side of the movable structure to a second pressure condition exterior of the bottle, with the movable structure moving in response to the loss of the vacuum pressure condition in the bottle; and monitoring movement of the movable structure to detect the loss of the vacuum pressure condition in the bottle when the electrical charge members are in either their first or second positions.

18. The method of claim 17 further comprising generating a signal when the loss of the pressure condition in the bottle is detected.

19. The method of claim 18 further comprising communicating the signal via an RF communication link.

20. The method of claim 18 further comprising communicating the signal via a fiber optics communication link.

21. The method of claim 18 wherein the signal is generated when there is a partial loss of the vacuum pressure in the bottle.

22. The method of claim 18 wherein the signal is generated only when there is a full loss of the vacuum pressure in the bottle.

* * * * *

UNITED STATES PATENT AND TRADEMARK OFFICE

CERTIFICATE OF CORRECTION

PATENT NO. : 7,302,854 B2
APPLICATION NO. : 11/305081
DATED : December 4, 2007
INVENTOR(S) : Egermeier et al.

It is certified that error appears in the above-identified patent and that said Letters Patent is hereby corrected as shown below:

Column 12, line 51, claim 6, the word “arrange” should read --arranged--.

Column 12, line 57, claim 7, the word “arrange” should read --arranged--.

Signed and Sealed this

Twentieth Day of May, 2008

JON W. DUDAS

*Director of the United States Patent and Trademark Office*